Oct. 6, 1959          R. J. BRISON          2,907,456
              SEPARATION OF MATERIALS
Filed May 21, 1957                    2 Sheets-Sheet 1
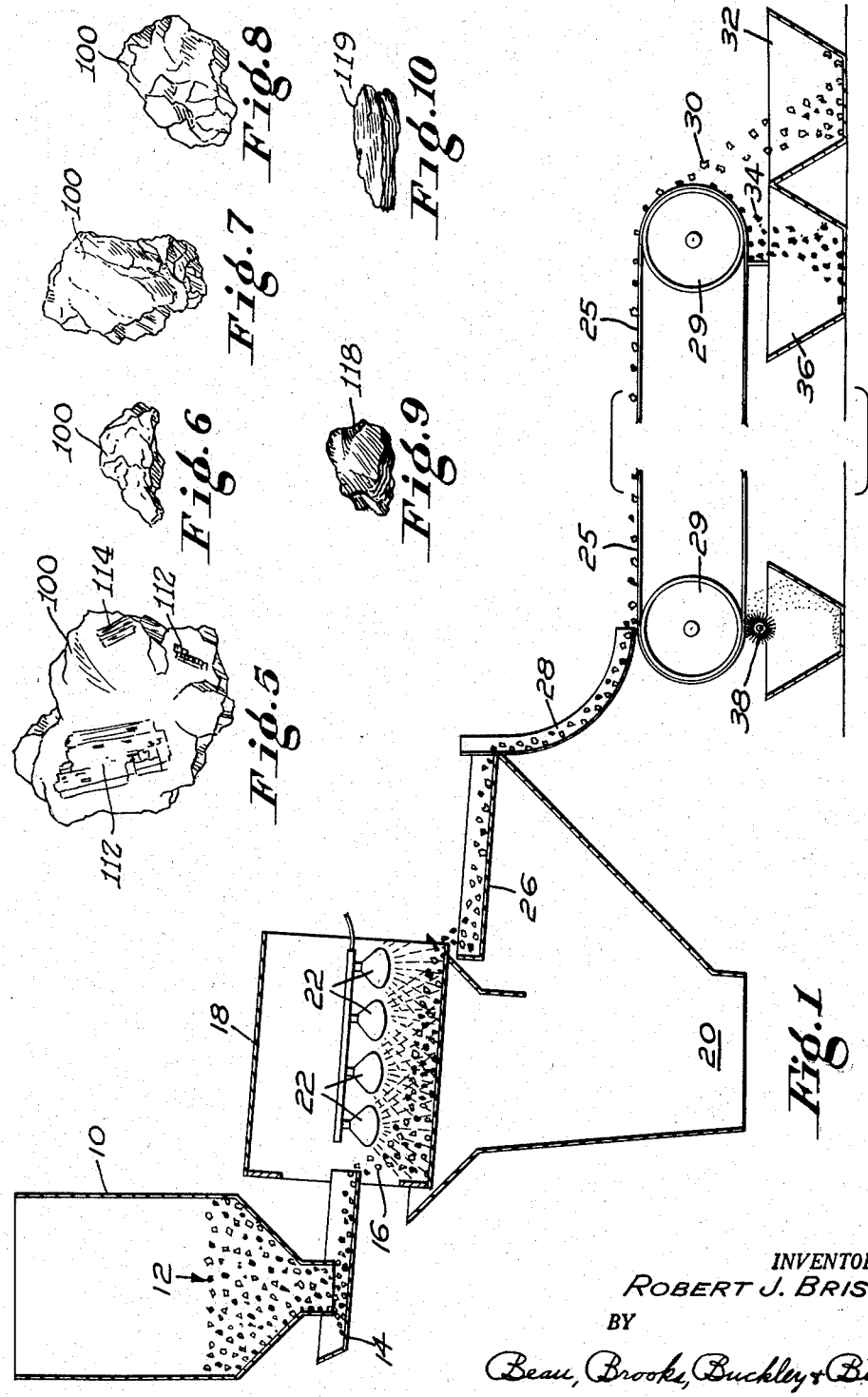
INVENTOR.
ROBERT J. BRISON
BY
Beau, Brooks, Buckley & Beau,
ATTORNEYS.

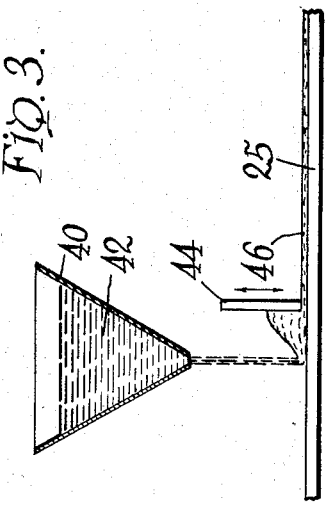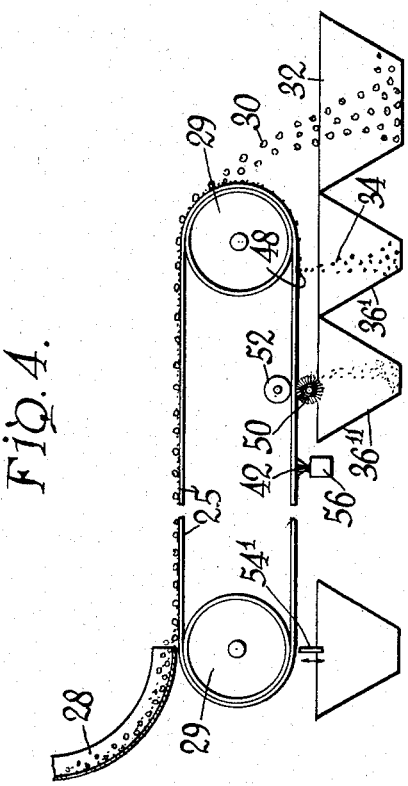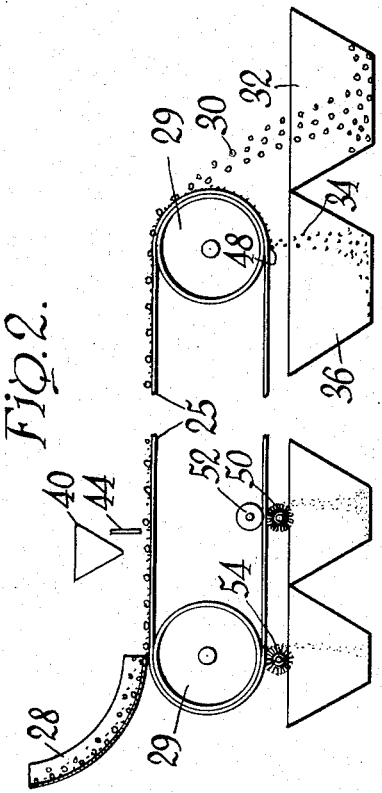

United States Patent Office 2,907,456
Patented Oct. 6, 1959

2,907,456

SEPARATION OF MATERIALS

Robert J. Brison, Columbus, Ohio, assignor, by mesne assignments, to International Salt Company, Scranton, Pa., a corporation of New Jersey Application May 21, 1957, Serial No. 661,270

22 Claims. (Cl. 209—11)

This invention relates to separation of materials, and more specifically to purification of certain materials by separation therefrom of impurities such as are normally included therein as mined or otherwise produced, whether in the form of gangue rock, other mineral impurities, or other undesirable materials. This application is a continuation-in-part of my pending applications Ser. No. 468,702, filed November 15, 1954, and Ser. No. 571,100, filed March 12, 1956, which latter is a continuation-in-part of Serial No. 468,703, all now abandoned.

For example, commercial minerals as mined in most localities will often include substantial percentages of lumps composed largely of the pure mineral, but appreciable percentages will also include quantities of other minerals or foreign materials, hereinafter termed "impurities"; and in order to render such run-of-mine products suitable for certain industrial uses, as in connection with the chemical industries or the like, it is desirable to first remove the totally impure and partially impure lumps and foreign substances from the run-of-mine material. A process for such separation of relatively impure particles from the run-of-mine material is preferably performed at the mining operation, so as to permit high quality material to be shipped directly from the mine to the consumer.

A primary object of the present invention is to provide a relatively simple and inexpensive materials separation process, such as may be readily applied for example to run-of-mine minerals, whereby substantially all of the lumps of impure substances and/or lumps including impurity substances in undesirable quantities, may be rapidly separated from the mine product material. The operation may be performed at any preferred point such as prior to, in the course of, or subsequent to transportation either to storage or loading facilities.

Another object of the invention is to provide a process as aforesaid which uses apparatus relatively inexpensive to install and use.

Another object of the invention is to provide a process as aforesaid such as requires the use of equipment of minimum size, and which may be satisfactorily operable at rates integrated with the rate of material production; so that the process of the invention may be readily incorporated as an accessory to the production plant with optimum results.

Other objects and advantages of the invention will appear in the specification hereinafter.

The invention contemplates generally, utilization of a phenomenon which has been noted to occur whenever lumps of certain materials in crystalline form are exposed to radiant heat. This phenomenon is referred to in the scientific literature as a characteristic of certain substances which are said to be diathermanous; that is to say, which allow relatively free passage of radiant heat. Sodium chloride salt; fluorite (fluorospar); sylvite; cryolite; and the halides of the alkali metals in general, are illustrative of this diathermanous characteristic which is not shared to equal degree by such substances as usually comprise the other components of the run-of-mine materials; as mentioned hereinabove. Thus, for example, it has been noted that a fragment of relatively pure diathermanous material as brought from the mine will readily transmit radiant heat therethrough while other athermanous substances as constitute the balance of the run-of-mine materials absorb to greater degree radiant heat emanating from any source to which they may be exposed.

Hence, in accord with the present invention the run-of-mine products including lumps of pure diathermanous material and lumps of athermanous materials, and lumps of diathermanous material having inclusions therein of athermanous materials, are equally exposed to any suitable source of radiant heat so that the various substances of the mixture are subjected to differential heating. The variably heated fragments of the mixture are then separated by any suitable method responsive to the differences in temperatures of the fragments, such as for example through use of conveyor means surface-treated so so as to be adhesive to greater degree to the fragments of higher temperatures.

In the drawings herewith:

Fig. 1 is a diagrammatic illustration of one form of apparatus such as may be used by way of example in conjunction with the process of the present invention;

Fig. 2 is a diagrammatic illustration corresponding to a portion of Fig. 1 showing a form of apparatus such as may be used in conjunction with the process of the present invention to apply and properly maintain the adhesive coating on the conveyor belt;

Fig. 3 is an enlarged, detail view of the adhesive coating applying means of Fig. 2;

Fig. 4 is a diagrammatic illustration corresponding to Fig. 2 but showing another form of apparatus such as may be used in conjunction with the process of the present invention to apply and properly maintain the adhesive coating on the conveyor belt;

Fig. 5 represents a typical section, on enlarged scale, through a fragment of mined rock salt containing anhydrite and dolomite inclusions;

Figs. 6, 7, 8, are elevational views of typical, relatively pure sodium chloride rock salt fragments;

Fig. 9 is an elevational view of a fragment of dolomite, such as is typically found in run-of-mine salt products; and Fig. 10 is an elevational view of a fragment of shale, such as is occasionally found in run-of-mine salt products.

Whereas it will be understood that either the athermanous fragments or the diathermanous fragments of any given mixture may comprise the more valuable material to be recovered from the "impurities" of the mixture being treated; in the interest of simplification of the specification hereinafter, the athermanous materials will be considered to be the impurities and the diathermanous materials will be considered to be the valuable or "pure" materials of the mix.

Fig. 5 illustrates the sectional appearance of a fragment of run-of-mine salt comprised generally of intergrown salt crystals as indicated at 100, and having included therein in typical fashion anhydrite crystals as indicated at 112, and a dolomite fragment as indicated at 114. Thus, Fig. 5 illustrates a type of rock salt fragment such as may be generally light colored and clear in appearance and therefore difficult to distinguish by the naked eye from a lump of pure rock salt; whereas it contains an undesirable percentage of impurities in the form of anhydrite, dolomite and other inclusions. As stated hereinabove, it has been noted that a fragment such as illustrated in Fig. 5, when subjected to radiant heat will become appreciably hotter than a similar sized fragment of relatively pure rock salt which will more readily transmit the radiant heat because of the diathermanous property previously referred to.

Figs. 6, 7, 8, illustrate substantially pure rock salt fragments such as are typically produced in rock salt mining, and which more readily transmit radiant heat when subjected thereto. Figs. 9 and 10 illustrate dolomite and shale fragments as indicated at 118–119, respectively. Such substances are substantially non-diathermanous and therefore tend to heat to greater degree when exposed to radiant heat, compared to substantially pure rock salt fragments.

By way of example, one form of suitable apparatus for segregation of athermanous fragments from diathermanous material fragments is illustrated diagrammatically in Fig. 1 wherein a feed hopper is indicated at 10 as being arranged to receive the run-of-mine output previously prepared and conveyed thereto in any suitable manner, as indicated at 12. Any suitable feeder such as a reciprocating feeder as indicated at 14 is disposed beneath the hopper 10 for conveying therefrom at a prescribed rate of flow, a feed supply of run-of-mine fragments as indicated at 16 into a heater which may take the form of an inclined cylindrical revolving screen as designated at 18. The aperture sizes of the screen 18 may of course be selected of any preferred dimensions so as to permit the screen to pass dust and undesirably fine particles into a diversion hopper as indicated at 20.

As is well known in the materials handling art, the cylindrical screen or heater 18 may be mounted in any conventional manner for rotation about its longitudinal axis whereby to simultaneously screen the feed material and to transport it from the feed end to the discharge end thereof while simultaneously tumbling the material granules during their passage from the feed end to the discarge end of the screen. A battery of infra-red lamps as indicated at 22 is arranged within the cylinder 18 so as to subject the tumbling materials fragments therein to radiant heat from the lamp 22. Thus, as explained hereinabove, the less diathermanous particles of the mixture, such as constitute the relatively impure fragments and/or fragments including foreign inclusions absorb substantial quantities of heat therefrom, and become heated to substantially higher temperatures than do the substantially pure diathermanous material fragments.

The cylinder 18 is arranged to discharge into some suitable chute device for feeding the differentially heated material onto a separation belt which is indicated at 25. For example, as shown in Fig. 1 the discharge from the cylinder 18 may be dropped onto a shaking feeder 26, the bottom of which may be solid or perforated to function as a supplemental dust screening device, as may be preferred. The discharge from the feeder 26 is thereupon delivered into an arcuate shaped chute 28 designed to deliver the discharge stream of material therefrom onto the moving belt 25 at substantially the same rate of travel as the lineal speed of the belt. The belt 25 may of course be carried by any suitable pulley devices such as indicated at 29—29, and driven by any suitable power means, as is well understood in the art.

In order to enable the belt 25 to separate the relatively pure and impure fragments, the belt may be coated with some suitable substance such as becomes tacky when heated, whereby the relatively hot impure fragments tend to adhere to the belt to greater degrees than the relatively cool purer fragments, as the belt conveys them to the discharge end thereof. The degree of differential heating; the adhesion characteristics of the coating material for the belt; the speed of belt travel; and the length of the belt from feed to discharge end portions thereof, are all selected and correlated so that by the time the fragments reach the discharge end portion of the belt the relatively impure particles thereof are more firmly adhesively attached to the belt coating, while the relatively pure fragments are substantially unattached to the belt coating. Consequently, as the belt trains over the discharge end pulley thereof, the relatively pure fragments are centrifugally projected within a path range as indicated at 30 so as to be adapted to be caught in a receiver 32, while the relatively impure particles tend to adhere to the belt throughout a longer length of travel around the end pulley, and subsequently discharge in a different stream or range as indicated at 34 so as to be caught for example in a second receiver 36. Obviously, any number of receivers may be used in lieu of the two receivers as shown to obtain any preferred number of separations of the feed material.

Whereas, the radiant heat source has been illustrated and described hereinabove as being in the form of a battery of infra-red lamps; any other suitable source of radiant heat might be used. For example, other forms of incandescent filament lamps or metal sheathed heating elements such as are commercially available under the trade mark "Chromalox" may be satisfactory for the purpose. Furthermore, resistance-heated refractories such as silicon carbide refractory sold under the trade-mark "Globar" may be used, as may radiant gas burners, such as are commercially manufactured and sold by the Selas Corporation of America under the trade-mark "Duradiant Burners." Some suitable form of arc lamp may also be employed. Obviously, for best results it is desirable to select a heat source such that most of the radiation is in the wave length range that will be strongly absorbed by the gangue minerals, but which will be relatively freely transmitted by the pure diathermanous fragments. Thus, the type of heat source selected may vary with the substances being mined.

Whereas, the heater 18 referred to hereinabove is of the revolving cylinder type, it is to be understood that any other suitable device may be employed whereby the feed material may be uniformly exposed to the radiant heat. The conveyor 26 is preferably employed as described hereinabove for the purpose of leveling off the discharge from the heater 18 and to provide a time lapse between the time of discharge of the heated material onto the conveyor 26 and the discharge therefrom, so that the heat induced internally of the relatively impure substances of the feed will have opportunity to permeate to the external surfaces of the feed fragments.

The adhesive coating material for the belt 25 may be in the form of any suitable natural or synthetic thermoplastic substance or compound of substances. It is, of course, a prerequisite that the material, subsequent to application to the belt 25, will not be sticky at room temperature, because otherwise the pure fragments will adhere thereto as well as the gangue or impure substances. The softening point of the adhesive material should, of course, be low enough that the impure and gangue fragments will stick to it even though they are heated only slightly during the process hereinabove described; because if the softening point is too high the cost of heating the feed mixture to a sufficient degree to provide adequate separation results, would be excessive. It has been observed that various natural or synthetic adhesive compositions such as are suitable for this work are available on the market.

For example, a synthetic preparation manufactured and sold by the Pennsylvania Industrial Chemical Corporation of Clairton, Pennsylvania, under the trade-mark "Piccolastic A–50" has been found to provide very suitable results. This material is a soft solid at room temperature, and is defined as a resin polymer of styrene and its homologues, which are produced from mixtures of styrene and styrene homologues such as are obtained from the fractionation of crude solvents obtained from coke oven or gas house gas. These materials are permanently thermo-plastic and therefor are readily brushed or spread onto the belt in the manner of any other "hot melt" compound, or by thinning the material with a suitable solvent and then brushing or spraying it on the belt, permitting the solvent to subsequently evaporate.

Another suitable adhesive material for the purpose herein is manufactured and sold by the same concern under the trade-mark "Piccoumaron"; this material being a coumaron-indene type resin produced by polymerization of the unsaturated petroleum hydrocarbons occurring in coal, tar, light, oil, etc. Another somewhat similar compound is manufactured and sold by the Neville Chemical Corporation under the trade-mark "Paradene"; and another synthetic composition suitable for the purpose is sold under the trade-mark "Piccolyte" by the Pennsylvania Industrial Chemical Corporation; this composition comprising a pure hydrocarbon thermo-plastic terpene resin. Whereas, the synthetic resin compounds referred to specifically hereinabove have been found to be suitable for the purposes herein, they by no means are exhaustive of the list of suitable available materials; and are cited herein merely by way of example.

As indicated at 38 a revolving wire brush is preferably arranged to sweep lightly against the coated surface of the return strand of the belt 25 to prevent build up of a dust layer on the belt coating material, such as would otherwise reduce or nullify the efficacy of the adhesive coating material. The brush 38 may of course be powered by any suitable means, such as for example by being geared to the conveyor mechanism.

In this regard, optimum results are obtained by keeping the top surface of the adhesive coating on the belt 25 fresh and uncontaminated, because if the adhesive coating picks up too much dust, for example, its effectiveness is reduced. However, it is desired to avoid as far as possible any interruptions to the operation, to clean off the belt.

One solution of the problem is to initially apply a relatively thick adhesive coating to the belt, and then progressively remove the outer surface thereof as it becomes contaminated to expose successively fresh and uncontaminated surfaces. An apparatus suitable for carrying out this method is illustrated in Fig. 2 which corresponds generally to Fig. 1, except that in Fig. 2 the feed hopper 10; the run-of-mine output 12; the reciprocating feeder 14; the feed supply 16; the heater 18; the lamps 22; the diversion hopper 20; the shaking feeder 26 and part of the chute 28, which remain the same as previously described and as illustrated in Fig. 1, are not repeated for simplicity and ease of illustration. The separation belt 25; pulley devices 29; and receivers 32 and 36 are as shown in Fig. 1.

In this arrangement, the adhesive coating material can be supplied as from a reservoir 40 disposed above the upper strand of belt 25 (Figs. 2-3), and a spreader bar 44 is operatively associated therewith. The reservoir 40 can be heated in any conventional manner (not shown) to maintain the supply of adhesive material 42 therein in a suitably fluid state. The adhesive material is applied to the moving belt 25 as a "hot melt" and accumulates against and is levelled off by the spreader 44 which also can be heated in any suitable manner. Thus, the bar 44 spreads the adhesive material to form a coating 46, of for example about ⅛ inch thickness, on belt 25. It will be appreciated that control of the application of material 42 to belt 25, to provide the coating 46, can be accomplished in known manner by any conventional means which can include for example a discharge valve, not illustrated, for reservoir 40.

Once the coating 46 has been uniformly applied, the reservoir 40 is closed to shut off the supply of adhesive 42 and the spreader 44 is elevated, by appropriate means, to avoid interference with feed material being separated on belt 25. Material is then fed to belt 25 from chute 28 and separation is carried out in the manner previously described. The diathermanous fragments will follow the path 30 into the receiver 32, and the athermanous fragments will drop off the belt 25 and follow the path 34 into the receiver 36. In this form, a wire 48, disposed adjacent the return strand of belt 25, is substituted for the scraper element of Fig. 1 and insures that any fragments which have not previously fallen off belt 25 are forcibly detached. A plastic or fiber bristle brush 50, rotated in any conventional manner as for example by the mechanism driving the belt 25 can be arranged to brush against the coating 46 on the return strand to remove loose dust particles therefrom; and a small roller 52 can be positioned as shown to urge the return strand of the belt 25 against brush 50.

To continuously clean coating 46 to maintain a fresh, uncontaminated surface thereon for receiving material from chute 28, a device such as a scraper or wire brush 54 can be provided to bear against the coating 46 on the return strand of belt 25 and to brush the coating 46 in advance of its presentation at chute 28. This removes the contaminated outer layer of coating 46 and thereby continuously exposes a fresh layer of resin to the material being fed onto the belt 25 from chute 28. When the coating 46 is dissipated, the feed is shut off and a new adhesive coating is applied to the belt as explained above. Thus the adhesive coating is continuously, gradually removed during the separation process to at all times present an uncontaminated, fresh surface or layer to receive the feed supply. Instead of the above described spread-on method of applying the adhesive coating, brush or spray means such as are well known in the art could be used.

Another method of accomplishing the desired result is to continuously apply a fresh layer or surface of adhesive to the coating 46 concurrently with the separation process, and an apparatus suitable for carrying out this method is illustrated by way of example in Fig. 4. In this instance, the adhesive material 42 is applied to the belt by a suitable spray means as indicated at 56. The adhesive material is sprayed against the return strand of belt 25, either intermittently or continuously as may be preferred, without stopping the feed to the belt; and it can be applied as a solution in a volatile solvent, or it can be hot-sprayed thereon without dilution. The coating must be substantially free of solvent and cooled to room temperature by the time it has progressed to the point where the material to be separated is fed onto the belt. Thus, it will be seen that a fresh layer or surface is constantly maintained on the adhesive coating 46 by the addition of fresh adhesive material covering any contamination thereon. Dust particles tending to cling to the belt are removed as much as possible from the adhesive coating, as by the plastic or fiber bristle brush 50, before application of the new coating by the spray device 56. To obtain a uniform distribution of the resin on the belt 25 the spray 56 can be arranged to traverse the width of the belt, either continuously or intermittently. Receivers 36' and 36'' are positioned to receive athermanous fragments and dust particles.

When the coating 46 has built up to an undesirable trickness on belt 25, it can be removed as by means of a brush or by the scraper 54' which can be heated to facilitate its operation. In the alternative, the position of spray means 56 and scraper 54' can be reversed to continuously maintain both a fresh surface and a coating of predetermined thickness.

It will be appreciated that the foregoing methods of, and apparatus for, applying the coating 46 and maintaining a fresh, uncontaminated surface thereon for receiving material to be separated, are given by way of example only and not in a limiting sense. Variations therein and modifications thereof, and other methods and apparatus will occur to those skilled in the art without departing from the spirit of the invention.

Whereas in the description hereinabove the diathermanous fragments have been assumed to be the "pure" or valuable constituents of the mixture being treated; it will of course be understood that such references were made by way of example only and that in lieu thereof the diathermanous materials of the mix may in fact constitute the "impurities" while the athermanous materials may constitute the "pure" or valuable constituents of the mixture being treated.

Also, the term "diathermanous" is used herein in a relative sense, and the invention is not necessarily limited to separation involving those materials which are commonly considered diathermanous. In fact, by virtue of this invention any materials having different heat absorption characteristics when exposed to radiant heat of any wavelength range can be separated. Where it is preferred to provide radiant heat which is limited to a certain wavelength range this can be accomplished by the use of suitable heat sources in conjunction with filters adapted to filter out radiations of undesired wavelengths. Also, it will be appreciated that, whereas the purification of mined minerals has been discussed in detail by way of example hereinabove, the invention is obviously equally applicable to the treatment of materials generally, regardless of how produced.

I claim:

1. The process of separating fragments of diathermanous materials from fragments of athermanous materials comprising the steps of exposing a mixture of fragments as aforesaid to radiant heat to cause the fragments to be differently heated, then delivering the differentially heated mixture in the form of a flat layer onto a moving conveyor arranged to train around a direction change device such as a pulley, the mixture receiving and conveying surface of said conveyor being of thermoplastic nature, whereby the fragments of the mixture settle upon said surface and tend to adhere thereto to different degrees and therefore project from the discharge end of said conveyor in divergent paths into separate receivers as the conveyor trains around said direction change device.

2. The process of separating fragments of relatively pure diathermanous materials and fragments of athermanous foreign substances and fragments of diathermanous materials containing inclusions of undesirable proportions of athermanous foreign substances, comprising the steps of exposing a mixture of fragments as aforesaid to radiant heat to cause the relatively pure fragments and the impure fragments to be differentially heated, then delivering the differentially heated mixture to a moving conveyor having its load carrying surface coated with a thermo-plastic substance whereby the relatively pure and impure fragments of the mixture tend to adhere to said surface to different degrees, and finally causing said fragments to be thrown away from said conveyor whereby to cause said relatively pure and impure fragments to project from said conveyor in divergent paths into separate receivers.

3. The process of separating fragments of relatively pure diathermanous materials from fragments of athermanous foreign materials and fragments of diathermanous materials containing inclusions of undesirable proportions of athermanous foreign substances, comprising the steps of exposing a mixture of fragments as aforesaid to radiant heat to cause the fragments to be differentially heated, then delivering the differentially heated mixture to a thermo-plastic surface, whereby the fragments of the mixture settle upon said surface and tend to adhere thereto to different degrees, and thereupon activating said surface so as to separately discharge said relatively pure and impure fragments therefrom.

4. Apparatus for separating fragments of diathermanous materials and fragments of athermanous materials, comprising means for exposing a mixture of fragments as aforesaid to radiant heat to cause the relatively diathermanous fragments and athermanous fragments to be differentially heated, a moving endless conveyor belt having its load carrying surface coated with a thermo-plastic substance upon which the heated mixture is spread whereby the fragments of the mixture tend to adhere to said surface to different degrees, said belt training around a discharge end pulley at predetermined speed whereby said fragments are thrown away from said conveyor so as to cause said diathermanous and athermanous fragments to project from said conveyor in divergent paths into separate receivers.

5. Means for separating fragments of diathermanous materials from fragments of athermanous materials, comprising means for exposing a mixture of fragments as aforesaid to radiant heat to cause the fragments to be differentially heated, means delivering the differentially heated mixture to a thermo-plastic surface to be spread thereon whereby the fragments of the mixture settle upon said surface and tend to adhere thereto to different degrees, and means actuating said surface to discharge said fragments therefrom in divergent direction paths, and separate receivers maintaining said fragments in segregated form.

6. The process of separating fragments of diathermanous materials from fragments of athermanous materials, comprising the steps of exposing a mixture of fragments as aforesaid to radiant heat to cause the fragments to be differentially heated, then bringing the differentially heated mixture into contact with a thermo-plastic body whereby the fragments of the mixture tend to adhere to said body to different degrees, and thereupon separately removing from said body those fragments which adhere more firmly and those fragments which adhere less firmly or which do not adhere.

7. The process of separating fragments of diathermanous materials from fragments of athermanous materials, comprising the steps of exposing a mixture of fragments as aforesaid to radiant heat to cause the athermanous fragments to be heated to higher degrees than the diathermanous fragments, then placing the differentially heated mixture in contact with a thermoplastic surface, whereby the fragments of the mixture tend to adhere thereto to different degrees, and thereupon separately removing from said surface the fragments according to their tendencies to adhere thereto.

8. The process of separating fragments of diathermanous materials from fragments of athermanous materials, comprising the steps of exposing a mixture of fragments as aforesaid to radiant heat to cause the fragments to be differentially heated, then delivering the differentially heated mixture to a thermo-plastic surfaced endless belt conveyor whereby the fragments of the mixture settle upon said conveyor surface and tend to adhere thereto to different degrees and separately discharge therefrom according to their tendencies to adhere thereto.

9. Apparatus for segregating fragments of diathermanous materials and fragments of athermanous materials, comprising means for exposing a mixture of fragments as aforesaid to radiant heat to cause the fragments to be differentially heated, a moving endless conveyor belt having its load carrying surface coated with a thermoplastic substance upon which the heated mixture is spread whereby the fragments of the mixture tend to adhere to said surface to different degrees, said belt training around a discharge end pulley at predetermined speed whereby said fragments are thrown away from said conveyor so as to cause said fragments to project from said conveyor in divergent paths into separate receivers, and brush means operating against an unloaded portion of said conveyor belt thereby maintaining said belt coated surface substantially free from non-tacky dust accumulations.

10. The process of separating fragments of diathermanous materials from fragments of athermanous materials comprising, exposing a mixture of such fragments to radiant heat to cause the same to be differentially heated, placing such differentially heated mixture in contact with a re-usable thermo-plastic body whereby the fragments of the mixture tend to adhere to said body to different degrees, separately removing the fragments from said body according to their tendencies to adhere thereto, and providing said body with a substantially fresh and uncontaminated surface between uses thereof.

11. The process of separating fragments of diathermanous materials from fragments of athermanous materials comprising, exposing a mixture of such fragments to radiant heat to cause the same to be differentially heated, delivering the differentially heated mixture to an endless belt conveyor having a thermo-plastic coating thereon, whereby the fragments settle on the conveyor coating and tend to adhere thereto to different degrees, separately discharging the fragments from the conveyor according to their tendencies to adhere to the coating thereon, and wearing away the outer layer of the conveyor coating to maintain a substantially fresh and uncontaminated surface thereon.

12. The process of separating fragments of diathermanous materials from fragments of athermanous materials comprising, subjecting a mixture of such fragments to radiant heat to cause the same to be differentially heated, placing such differentially heated fragments in contact with the load delivery strand of an endless conveyor belt having a thermoplastic surface whereby the fragments adhere thereto to different degrees, separately removing the fragments from the conveyor belt according to their tendencies to adhere thereto, and applying additional thermo-plastic material to the return strand of the belt to maintain a substantially fresh and uncontaminated surface thereon.

13. Means for separating fragments of diathermanous materials from fragments of athermanous materials comprising, means for exposing a mixture of fragments as aforesaid to radiant heat to cause the fragments to be differentially heated, means delivering the differentially heated mixture to a reusable thermo-plastic body to be spread thereon whereby the fragments of the mixture settle upon the surface of said body and tend to adhere thereto to different degrees, means actuating said body to discharge said fragments therefrom in divergent paths, and means providing said body with a substantially fresh and uncontaminated surface between uses thereof.

14. The process of separating from fragments of relatively pure substantially diathermanous salt, fragments of substantially athermanous foreign materials and fragments of salt containing inclusions of undesirable proportions of substantially athermanous foreign substances, comprising the steps of exposing a mixture of fragments as aforesaid to radiant heat to cause the relatively pure salt fragments and the impure fragments to be differentially heated, then delivering the differentially heated mixture in the form of a flat layer onto a moving conveyor arranged to train around a direction change device such as a pulley, the mixture receiving and conveying surface of said conveyor being of thermo-plastic nature, whereby the relatively pure and impure fragments of the mixture settle upon said surface and tend to adhere thereto to different degrees and therefor project from the discharge end of said conveyor in divergent paths into separate receivers as the conveyor trains around said direction change device.

15. The process of segregating fragments of relatively pure substantially diathermanous salt and fragments of substantially athermanous foreign substances and fragments of salt containing inclusions of undesirable proportions of such foreign substances, comprising the steps of exposing a mixture of fragments as aforesaid to radiant heat to cause the relatively pure salt fragments and the impure fragments to be differentially heated, then delivering the differentially heated mixture to a moving conveyor having its load carrying surface coated with a thermo-plastic substance whereby the relatively pure and impure fragments of the mixture tend to adhere to said surface to different degrees, and finally causing said fragments to be thrown away from said conveyor whereby to cause said relatively pure and impure fragments to project from said conveyor in divergent paths into separate receivers.

16. The process of separating from fragments of relatively pure substantially diathermanous salt, fragments of substantially athermanous foreign materials and fragments of salt containing inclusions of undesirable proportions of substantially athermanous foreign substances, comprising the steps of exposing a mixture of fragments as aforesaid to radiant heat to cause the relatively pure salt fragments and the impure fragments to be differentially heated, then delivering the differentially heated mixture to a thermo-plastic surface, whereby the relatively pure and impure fragments of the mixture settle upon said surface and tend to adhere thereto to different degrees, and thereupon activating said surface so as to separately discharge said pure and impure fragments therefrom.

17. Apparatus for segregating fragments of relatively pure substantially diathermanous salt and fragments of substantially athermanous foreign substances and fragments of such salt containing inclusions of undesirable proportions of such foreign substances, comprising means for exposing a mixture of fragments as aforesaid to radiant heat to cause the relatively pure salt fragments and the impure fragments to be differentially heated, a moving endless conveyor belt having its load carrying surface coated with a thermo-plastic substance upon which the heated mixture is spread whereby the relatively pure and impure fragments of the mixture tend to adhere to said surface to different degrees, said belt training around a discharge end pulley at predetermined speed whereby said fragments are thrown away from said conveyor so as to cause said relatively pure and impure fragments to project from said conveyor in divergent paths into separate receivers.

18. Means for separating fragments of relatively pure substantially diathermanous salt from fragments of substantially athermanous foreign materials and fragments of such salt containing inclusions of undesirable proportions of such foreign substances, comprising means for exposing a mixture of fragments as aforesaid to radiant heat to cause the relatively pure salt fragments and the impure fragments to be differentially heated, means delivering the differentially heated mixture to a thermo-plastic surface to be spread thereon whereby the relatively pure and impure fragments of the mixture settle upon said surface and tend to adhere thereto to different degrees, and means actuating said surface to discharge said pure and impure fragments therefrom in divergent direction paths, and separate receivers maintaining said fragments in segregated form.

19. The process of separating from fragments of relatively pure substantially diathermanous salt, fragments of substantially athermanous foreign material and fragments of salt containing inclusions of undesirable proportions of substantially athermanous foreign substances, comprising the steps of exposing a mixture of fragments as aforesaid to radiant heat to cause the relatively pure salt fragments and the impure fragments to be differentially heated, then bringing the differentially heated mixture into contact with a thermo-plastic body whereby the relatively pure and impure fragments of the mixture tend to adhere to said body to different degrees, and thereupon separately removing from said body those fragments which adhere more firmly and those fragments which adhere less firmly or which do not adhere.

20. The process of separating from fragments of relatively pure substantially diathermanous salt, fragments of substantially athermanous foreign material and fragments of salt containing inclusions of undesirable proportions of substantially athermanous foreign substances, comprising the steps of exposing a mixture of fragments as aforesaid to radiant heat to cause the relatively impure fragments to be heated to higher degrees than the relatively pure fragments, then placing the differentially heated mixture in contact with a thermo-plastic surface, whereby the relatively pure and impure fragments of the mixture tend to adhere thereto to different degrees, and thereupon separately removing from said surface the fragments according to their tendencies to adhere thereto.

21. The process of separating from fragments of relatively pure substantially diathermanous salt, fragments of substantially athermanous foreign material and fragments of salt containing inclusions of undesirable proportions of substantially athermanous foreign substances, comprising the steps of exposing a mixture of fragments as aforesaid to radiant heat to cause the relatively pure salt fragments and the impure fragments to be differentially heated, then delivering the differentially heated mixture to a thermo-plastic surfaced endless belt conveyor whereby the relatively pure and impure fragments of the mixture settle upon said conveyor surface and tend to adhere thereto to different degrees and separately discharge therefrom according to their tendencies to adhere thereto.

22. Apparatus for segregating fragments of relatively pure substantially diathermanous salt and fragments of substantially athermanous foreign substances and fragments of such salt containing inclusions of undesirable proportions of such foreign substances, comprising means for exposing a mixture of fragments as aforesaid to radiant heat to cause the relatively pure salt fragments and the impure fragments to be differentially heated, a moving endless conveyor belt having its load carrying surface coated with a thermo-plastic substance upon which the heated mixture is spread whereby the relatively pure and impure fragments of the mixture tend to adhere to said surface to different degrees, said belt training around a discharge end pulley at predetermined speed whereby said fragments are thrown away from said conveyor so as to cause said relatively pure and impure fragments to project from said conveyor in divergent paths into separate receivers, and brush means operating against an unloaded portion of said conveyor belt thereby maintaining said belt coated surface substantially free from non-tacky dust accumulations.

No references cited.